United States Patent [19]

Harding et al.

[11] 4,135,271
[45] Jan. 23, 1979

[54] TIRE CLEANING BRUSH

[76] Inventors: Maurice R. Harding, 8540 SW. Spruce St., Portland, Oreg. 97223; David D. Teeney, 14334 NE. Sandy Blvd., Portland, Oreg. 97230

[21] Appl. No.: 820,693

[22] Filed: Aug. 1, 1977

[51] Int. Cl.² .............................................. B60S 3/04
[52] U.S. Cl. ..................... 15/53 B; 15/231; 15/DIG. 2
[58] Field of Search ............... 15/114, 33, 231, 21 A, 15/49 R, 50 R, 49 R, 49 B, 53 B, DIG. 2, 180, 160

[56] References Cited

U.S. PATENT DOCUMENTS

| | | | |
|---|---|---|---|
| 1,909,869 | 5/1933 | Randrup | 15/53 B |
| 2,934,775 | 5/1960 | Bergstrom | 15/180 X |
| 3,750,224 | 8/1973 | Krusche | 15/231 |
| 4,020,518 | 5/1977 | Harding et al. | 15/53 B |
| 4,069,536 | 1/1978 | Hartz et al. | 15/160 |

FOREIGN PATENT DOCUMENTS 787335 12/1957 United Kingdom .................. 15/49 RB

*Primary Examiner*—Peter Feldman
*Attorney, Agent, or Firm*—James D. Givnan, Jr.

[57] ABSTRACT

A brush structure including a resilient member which deforms upon contact with a tire sidewall to bias bristles on the resilient member into forceful contact with a moving tire sidewall. A brush assembly is disclosed which supports the present brush structure for movement toward and away from a vehicle wheel assembly and also serves to oscillate the brush against the tire sidewall.

1 Claim, 7 Drawing Figures

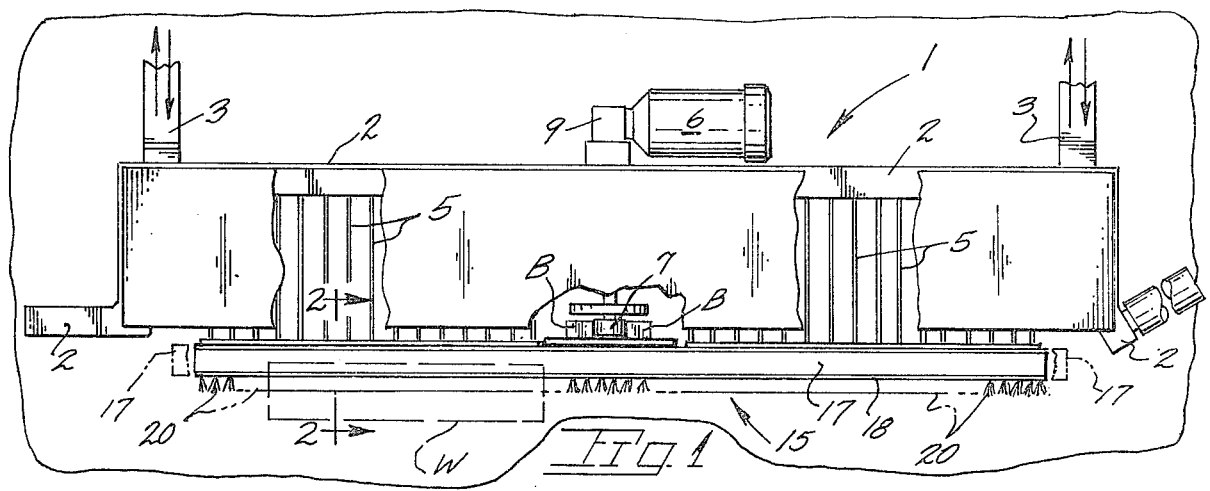
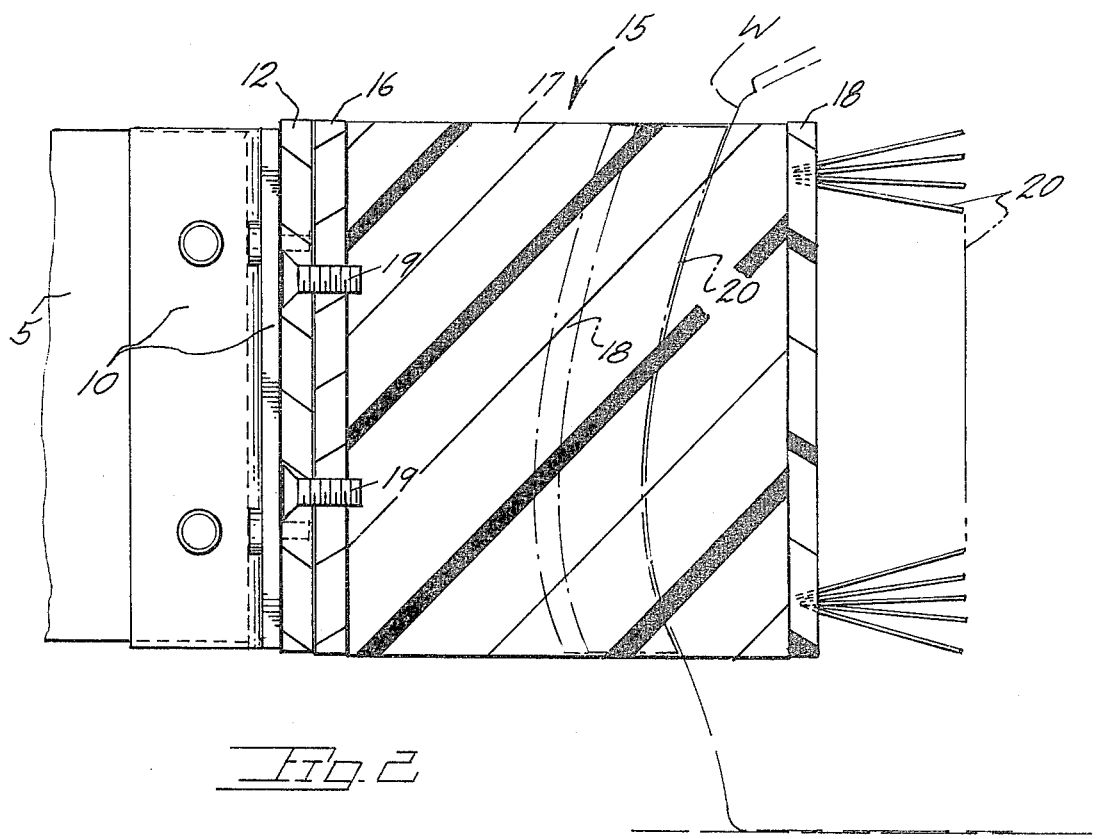
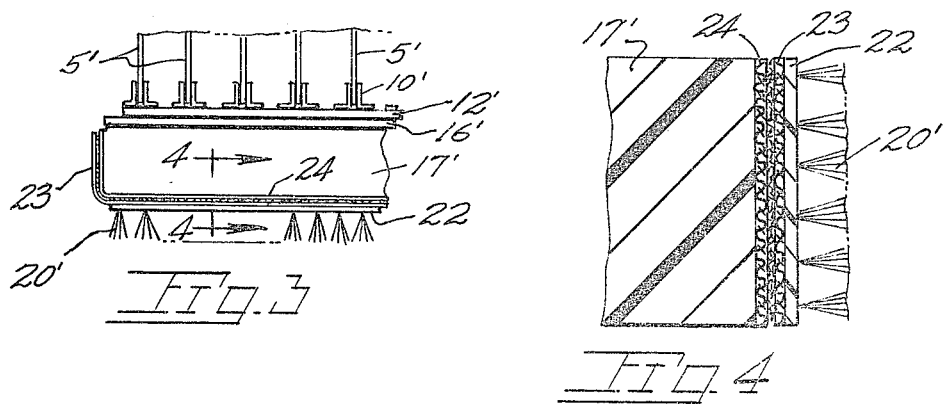
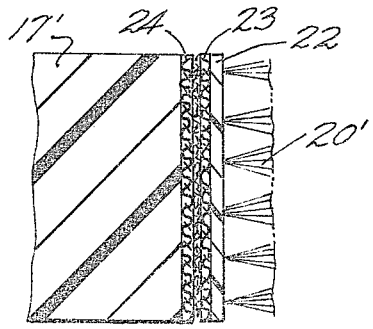

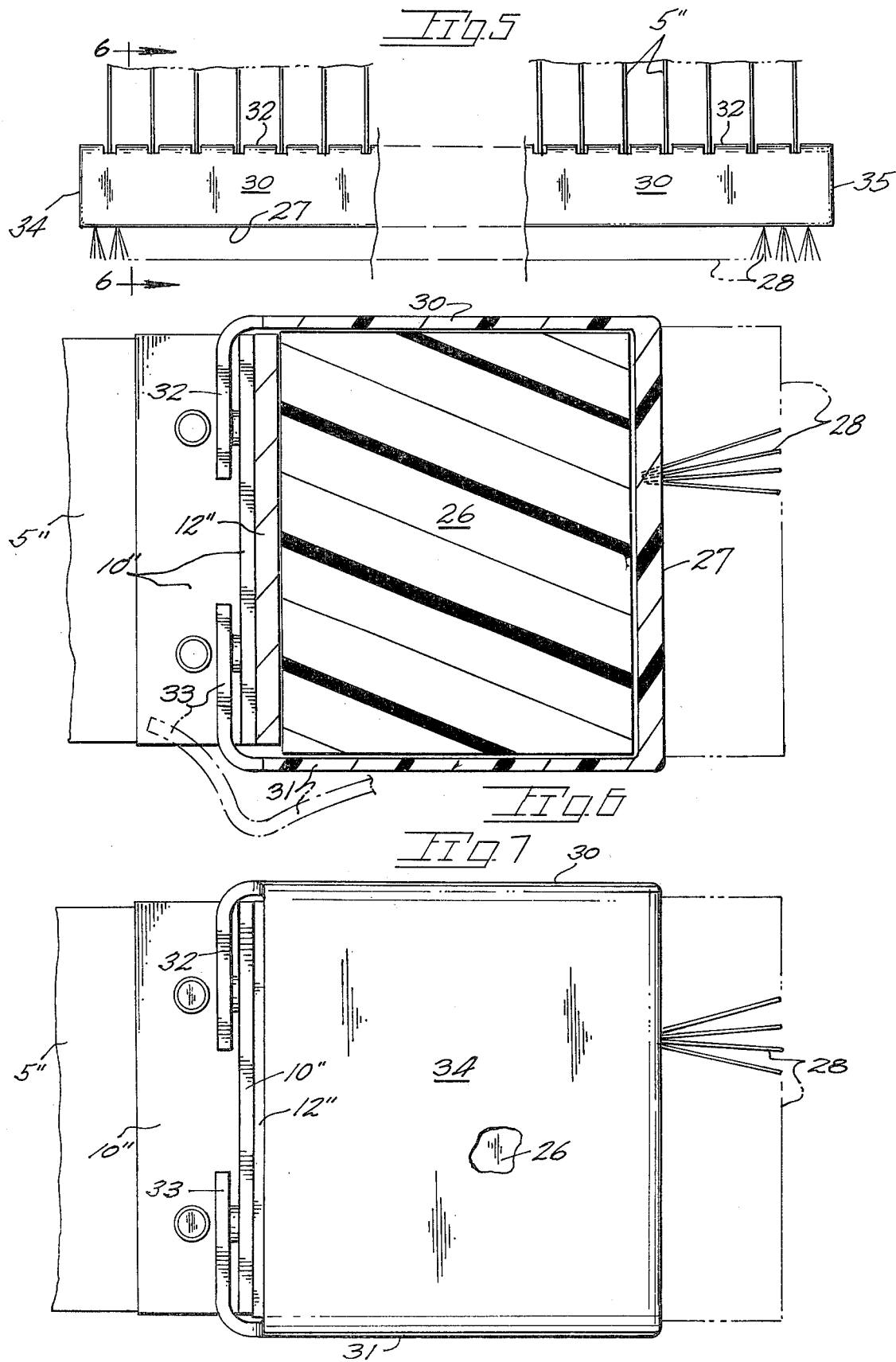

TIRE CLEANING BRUSH

BACKGROUND OF THE INVENTION

The present invention concerns equipment for the cleaning of automotive tires such as the type of equipment found in automated car wash establishments. The present brush structure includes a resilient member which conforms to tire sidewall configuration to enhance the cleaning action of bristles carried by the resilient member.

A problem exists in accomplishing the thorough cleaning of a tire sidewall as the automobile moves through a carwash installation. U.S. Pat. No. 4,020,518 owned by the joint inventors of the present brush invention, discloses a tire cleaning apparatus wherein a brush is oscillated back and forth across the sidewall of a moving vehicle tire. The brush disclosed therein comprises a rigid brush back with protruding bristles. While the brush disclosed in the above issued U.S. patent is satisfactory, the present brush constructions is deemed to constitute an advance in the art thereover.

SUMMARY OF THE PRESENT INVENTION

The present invention is embodied within a combined brush structure and a tire cleaning apparatus. The compressible member is deformed during the tire passage and contributes to bristle-tire sidewall contact.

The present brush structure is adapted to be supported in a yieldable manner which permits oscillation of the brush structure back and forth across a segment of a moving tire sidewall. The compressible member of the present structure may be of foamed construction to yield in response to a tire sidewall. The back and forth movement of the brush during operation draws the bristles in a path across the convex tire sidewall with the bristles being biased into sidewall contact by the compressible brush member acting in concert with other brush positioning means as disclosed in the above mentioned patent.

Important objects of the present brush structure include the provision of a brush adapted to move in an oscillated manner thereby drawing brush bristles along an irregular path determined by the tire sidewall; the provision of a brush structure wherein the bristles are provided with minute, embedded abrasive particles which supplement the cleaning action of the bristles; the provision of a brush structure lending itself to convenient replacement on a tire cleaning apparatus with replacement being effected simply by removal of fasteners; the provision of a brush structure of a light weight nature which lends itself to rapid oscillating motion with minimum wear on brush supporting and driving components of a tire cleaning apparatus; the provision of a brush with a detachable backing.

These and other objects will become apparent upon a reading of the following description.

BRIEF DESCRIPTION OF THE DRAWINGS

In the accompanying drawing:

FIG. 1 is a plan view of the present brush structure in supported attachment on an auto tire cleaning apparatus;

FIG. 2 is a vertical sectional view of the brush structure taken on line 2—2 of FIG. 1 with a broken line position showing the brush deformed during sidewall contact;

FIG. 3 is a fragmentary plan view of a modified brush;

FIG. 4 is a sectional view taken along line 4—4 of FIG. 3 showing a detachable brush strip.

FIG. 5 is a plan view of still another form of the invention sectioned for illustration purposes;

FIG. 6 is a vertical sectional view of the modified brush taken along line 6—6 of FIG. 5; and FIG. 7 is an end view of the left hand end of FIG. 5.

DETAILED DESCRIPTION OF THE PREFERRED EMBODIMENTS

With continuing attention to the accompanying drawing wherein applied reference numerals indicate parts similarly identified in the following description, the reference numeral 1 indicates generally a positionable brush assembly which includes a frame 2 which may be advanced toward and away from a vehicle wheel assembly W in the arrow indicated directions by powered means not shown. The brush assembly is supported by telescopic sections 3 which terminate in sliding attachment (unseen) to the remaining portion of a tire cleaning apparatus. Said apparatus is disclosed in the aforementioned U.S. patent. The brush assembly 1 additionally includes a series of yieldable connector plates 5 attached at one end to brush assembly frame 2 and, at their outer ends, support angle segments 10. A motor at 6 is supported on brush frame 2 and drives an eccentric means shown as a roller 7 in an orbiting manner against blocks B to impart rectilinear movement to the present brush structure. A speed reducer 9 serves to mount the motor to said frame. From the foregoing it will be seen that the brush assembly 1 may advance horizontally toward the wheel assembly W of a vehicle and, at the end of a tire cleaning operation, retract away from the vehicle path. Also it will be seen that motor 6 drives the present brush invention in an oscillating manner during tire contact.

With attention now to the brush structure embodying the present invention, the brush structure is indicated generally at 15 and is supported in place by the yieldable plates earlier described. With attention to FIG. 2 wherein a sectional view of the brush structure is provided, the structure includes attachment means such as an attachment strip 16 extending lengthwise along a resilient or compressible member 17. The attachment strip 16 serves to attach the present brush structure to a rigid brush supporting strip at 12 which, in turn is jointly carried by the outer ends of the yieldable plates. Corresponding openings in rigid strip 12 and attachment strip 16 receive threaded fasteners 19 providing convenient attachment of the present brush structure to strip 12 of the tire cleaning apparatus.

Secured to the outer side of resilient member 17 is a brush backing indicated at 18 from which project bristles 20. Backing 18 is of a synthetic, flexible material such as polyurethane, enabling the backing to progressively flex in the presence of a convex tire sideall. The bristles 20 are preferably formed from a synthetic material such as nylon with particles embedded therein which supplement the cleaning action of the bristles on the tire sidewall. The embedded particles may be abrasive, such as silica carbide, having a grit rating of 80. The present bristles are formed integral with backing 18 with the latter, in turn, bonded in a suitable manner to the outward surface of resilient member 17. One suitable type of bristle and backing is sold under the trademark NYBRAD.

In operation, the present brush is oscillated at approximately 600 strokes per minute with the bristles 20, backing 18 and resilient member 17 progressively deforming as the brush is moved chordally past or across a moving tire sidewall. Sidewall movement in conjunction with rectilinear brush motion results in a multidirectional scrubbing action of the bristles against the sidewall to assure thorough cleaning of the latter.

The brush structure, in one form is several feet in length with resilient member 17 approximately 7.5 centimeters in width. Said resilient member may be of a foamed, elastomeric material preferably of closed cellular construction to avoid water absorption.

In FIGS. 3 and 4 a first modified tire brush includes components similar to those earlier described and which components are identified by prime reference numerals. A modified backing at 22 for bristles 20' includes a fabric strip 23 which is attachable to a second fabric strip 24 affixed to a resilient member 17'. Both of said fabric strips are secured in place by a suitable adhesive or other securing arrangement. The fabric strips 23 and 24 are desirably of a snythetic fabric fastener sold under the registered trademark VELCRO. Such a fastening arrangment of brush backing 22 permits worn bristles and their backing to be peeled back from permanent fabric strip 24 and a replacement backing and bristles to be applied to strip 24. To prevent inadvertent separation of strips 23 and 24, the same extend around the ends of resilient member 17 as shown in FIG. 3.

In FIGS. 5, 6 and 7 still another form of the invention is disclosed wherein parts similar to those above mentioned are identified by similar double prime reference numerals. This modification dispenses with an attachment strip earlier indicated at 16 and instead, relies upon a flexible shell for attachment of a resilient member 26 to the yieldable connector strips 5" of the brush apparatus.

The shell includes a bristle supporting, flexible front wall 27 with bristles 28 and having flexible top and bottom wall members 30 and 31. Upper and lower back wall members at 32 and 33 are relieved at intervals therealong to permit the back walls to flex into interspersed engagement with angle segments 10" of the earlier described brush apparatus as shown in FIG. 6. The back walls, so relieved, provide upper and lower series of tab-like flanges which are interposed, upon shell attachment, between the yieldable connectors 5" and angle sections 10" thereon.

The shell includes end walls at 34 and 35 which serve to confine the ends of resilient member 26.

The shell is preferably of a durable synthetic material such as polyurethane with front wall 27 molded to embed therein the ends of bristles 28 as earlier mentioned. The top and bottom walls 30-31 are of a thickness to permit flexing of same during shell attachment and removal from about resilient member 26 and associated components supported at the ends of yieldable connector plates 5". The upright edges of back wall members 32 and 33 cooperate with angle sections 10" to prevent relative movement therebetween during brush operation. Brush replacement entails the outward flexing of the back walls 32 and 33 as the flexible shell is pulled outwardly from the brush apparatus momentarily displacing said walls.

While we have shown but a few embodiments of the invention it will be apparent to those skilled in the art that the invention may be embodied still otherwise without departing from the spirit and scope of the claimed invention.

Having thus described the invention what is desired to be secured under a Letters Patent is:

1. In combination, an automobile tire cleaning apparatus having a series of yieldable connector plates each terminating in supporting attachment to a brush supporting rigid strip, a motor and eccentric means for imparting rapid rectilinear motion to said strip, and a brush structure including an attachment strip, fasteners in place along said attachment strip removably securing same to said brush supporting rigid strip, a foamed cellular member carried by said attachment strip, a flexible backing strip in place on said cellular member and having bristles thereon for scrubbing contact with a tire sidewall along a rectilinear path.

* * * * *